May 22, 1945.  R. E. SMITH  2,376,827
STEP-UP SWITCH FOR ELECTRIC ARC WELDING
Filed May 15, 1943  2 Sheets-Sheet 1
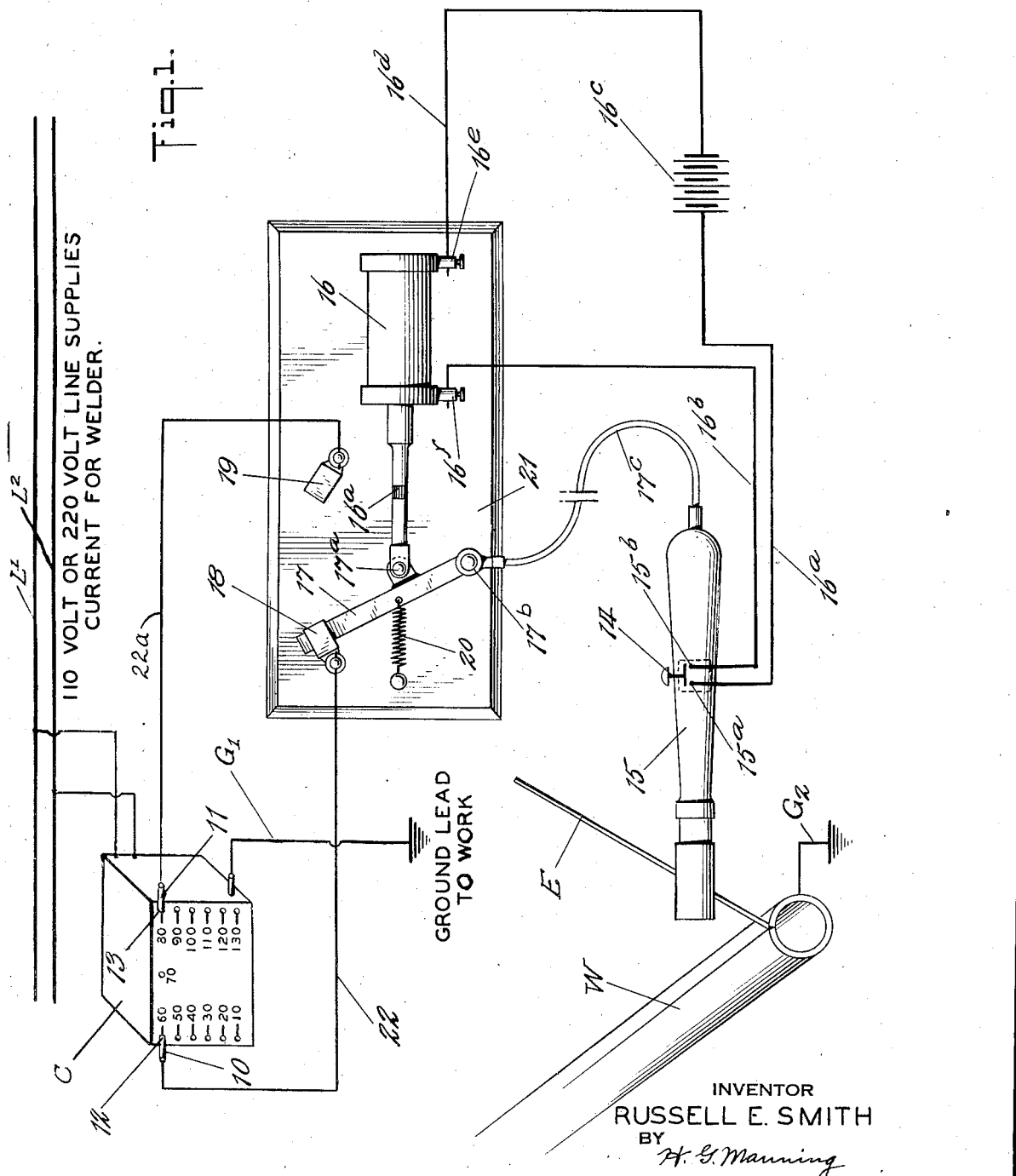
INVENTOR
RUSSELL E. SMITH
BY
H. G. Manning
ATTORNEY May 22, 1945.    R. E. SMITH    2,376,827
STEP-UP SWITCH FOR ELECTRIC ARC WELDING
Filed May 15, 1943    2 Sheets-Sheet 2
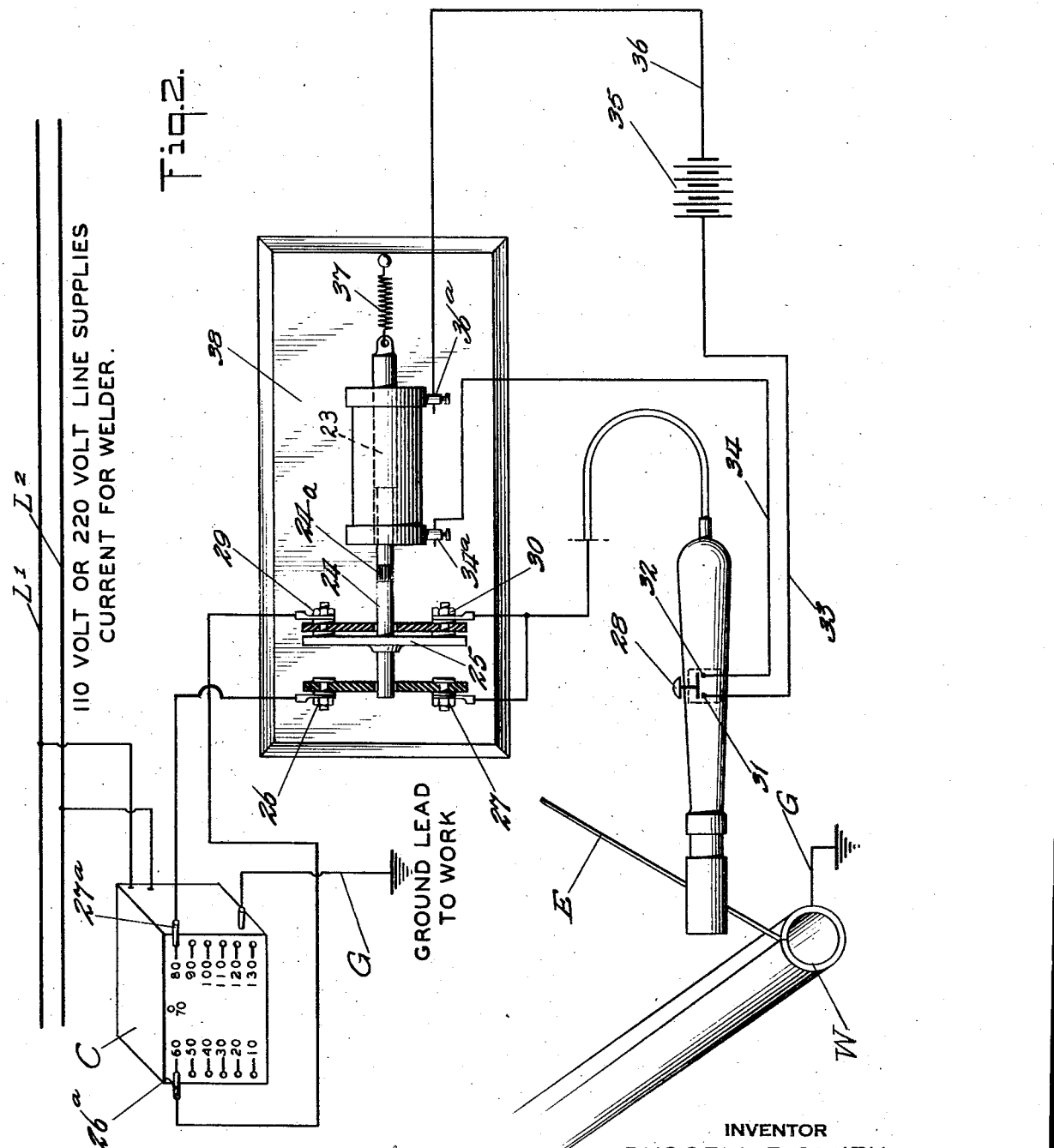
INVENTOR
RUSSELL E. SMITH
BY
H. G. Manning
ATTORNEY Patented May 22, 1945

2,376,827

UNITED STATES PATENT OFFICE 2,376,827

STEP-UP SWITCH FOR ELECTRIC ARC WELDING

Russell E. Smith, Palmer, Mass.

Application May 15, 1943, Serial No. 487,174

4 Claims. (Cl. 315—293)

This invention relates to electric arc welding, and more particularly to an improved apparatus for supplying the welding arc with an initial high starting current which may be quickly reduced to the normal operating value by means of a manually controlled switch as soon as the work has been heated up sufficiently.

One object of the invention is to provide an arc welding apparatus of the above nature in which the circuit through the arc will be manually controlled by means of a solenoid-operated switch actuated by means of a push button switch carried on the electrode handle whereby the high starting current in the arc will be instantly reduced to normal at the will of the operator.

A further object is to provide a step-up switch for an electric arc welding apparatus of the above nature, in which the welding current will be instantly shifted rapidly from the initially high starting current to a lower normal operating current as soon as the push button is released, without breaking the welding arc.

A further object is to provide an electric arc welding apparatus of the above nature which will be simple in construction, inexpensive to manufacture, easy to install and manipulate, compact, and very efficient and durable in use.

With these and other objects in view there have been illustrated by the accompanying drawings, two forms in which the invention may conveniently be embodied in practice.

In the drawings:

Figure 1 represents a diagrammatic view of an electric arc welding apparatus embodying one form of the invention.

Figure 2 is a similar diagrammatic view embodying a second form of the invention.

The present invention is especially adapted for use in the manufacture of welded fuselage tubing employed in fighting and bombing airplanes.

Referring now to the drawings in which like reference numerals denote corresponding parts throughout the several views, the letter C indicates a resistance control box connected by line wires $L_1$ and $L_2$ to a supply of alternating current. The control box C is connected with a wire $G_1$ leading to the work being welded through a "ground," and also to a pair of lead plugs 10 and 11 for selectively controlling the supply of current through a switch box 21, to be described later, to the arc between the welding electrode E and the work W, at two different values, one for "starting" and the other for normal welding. As herein illustrated, these current values may be 80 amperes and 60 amperes respectively, and to attain this result the lead plugs 10 and 11 are inserted in a 60-ampere socket 12 and an 80-ampere socket 13 respectively of the control box C. It will be understood, however, that any other desired "starting" and "normal" welding currents may be employed.

In order to provide a manual control to permit shifting the current at will from the "starting" to the "normal" welding values supplied to the arc, provision is made of a switch having a push button 14 movably mounted on an electrode handle 15, said push button being adapted to form a "bridge" connection between a pair of stationary switch contacts 15a and 15b also mounted in said handle 15.

The contact 15a is connected by a wire 16a to a battery 16c which in turn is connected to a wire 16d to one terminal 16e of a solenoid 16, the other terminal 16f of said solenoid being joined by a wire 16b to said contact 15b. The current is conducted through the handle 15 by a suitable insulated conductor (not shown) which leads to an arm 17 of the solenoid switch through an elongated flexible cable 17c.

The arm 17 is pivoted at 17b to the switch box 21, and at 17a to a plunger 16a adapted to reciprocate within the solenoid 16. The switch box 21 is provided with a pair of stationary contacts 18 and 19 adapted to be connected to the 60-ampere lead plug 10 and to the 80-ampere lead plug 11, as by wires 22 and 22a respectively. The solenoid arm 17 is normally held in the position shown in Figure 1 by means of a spring 20. It will be understood, however, that when the push button 14 is pressed inwardly, current will flow through the battery circuit including the solenoid 16 and will cause the plunger 16a to slide to the right swinging the switch arm 17 away from the contact 18 and into engagement with the contact 19.

By means of this construction it will be seen that the welding may be started with a relatively high current (such as 80 amperes) and shifted to a current at lower amperage (such as 60 amperes), whenever the operator has determined that the work has been sufficiently heated up. It will be understood that this shiftover from high to lower amperage will be made instantly quite rapidly upon release of the push button without any substantial disturbance to the arc passing between the electrode E and the work W.

*Second form of the invention*

In the modified form of the invention, Figure 2, the apparatus is identical with that shown in Figure 1 except in the construction of the solenoid switch, which is somewhat different from that of the first form.

In the modified form, a solenoid plunger 23 is provided having a reduced extension 24 terminating in a movable bridging vertical contact blade 25. An insulating intermediate block 24a is located in the plunger 23 and serves to protect the solenoid from the high welding currents passing through the switch.

A pair of stationary contacts 26 and 27 are provided for connecting the welding electrode to an 80-ampere lead plug 27a of the control box for "starting," and a similar pair of contacts 29 and 30 are provided for connecting the welding electrode to the 60-ampere lead plug 26a of the control box C for "normal" welding.

As in the first form of the invention, a push button 28 is provided in the electrode handle and is adapted to bridge the connection between a pair of stationary contacts 31 and 32 also mounted within said handle. The contacts 31 and 32 are connected to wires 33 and 34, the wire 34 leading directly to one terminal 34a of the solenoid, while the wire 33 leads to battery 35, which in turn is connected by a wire 36 to the other terminal 36a of the solenoid. In this instance the solenoid plunger 23 is biased to the right by a coil spring 37 which is connected to the base of the switch box 38.

The operation of the second form of the invention is similar in all respects to that of the first form.

While there has been disclosed in this specification two forms in which the invention may be embodied, it is to be understood that these forms are shown for the purpose of illustration only and that the invention is not to be limited to the specific disclosures but may be modified and embodied in various other forms without departing from its spirit. In short, the invention includes all the modifications and embodiments coming within the scope of the following claims.

Having thus fully described the invention, what is claimed as is now and for which it is desired to secure Letters Patent, is:

1. In an electrical arc welding apparatus, a resistance control box having a plurality of lead-out sockets representing different welding current values, means for connecting said box to a source of current, a pair of current lead plugs adapted to be selectively connected to any two of said sockets, a switch having a pair of stationary contacts connected to said current lead plugs respectively, said switch having a movable contact arm for connection to a welding electrode, spring means to normally hold said arm in engagement with the stationary contact connected to the lead plug of lower current value, a solenoid-operated plunger connected to said arm, and a direct current push button-operated circuit for energizing said solenoid to temporarily swing said arm into engagement with the stationary contact connected to the lead of higher current value for "starting" the weld, said spring serving to automatically return said switch arm to its normal position, when said push button is released.

2. In an electrical arc welding apparatus, a resistance control box having a plurality of lead-out sockets representing different welding current values, means for connecting said box to a source of current, a pair of current lead plugs adapted to be selectively connected to any two of said sockets, a switch having a pair of stationary contacts connected to said current lead plugs respectively, said switch having a movable contact arm for connection to a welding electrode, spring means to normally hold said arm in engagement with the stationary contact connected to the lead plug of lower current value, a solenoid-operated plunger connected to said arm, and a direct current circuit for energizing said solenoid to temporarily swing said arm into engagement with the stationary contact connected to the lead plug of higher current value for "starting" the weld.

3. In an electrical arc welding apparatus, a resistance control box having a plurality of sockets representing different welding current values, a source of current connected to the input terminals of said box, means for connecting one output terminal of said box through the ground to the article being welded, the other output terminal of said box comprising a plurality of lead-out sockets representing different welding current values, a pair of current lead plugs to be selectively inserted into any two of said sockets, a solenoid-operated switch having a pair of stationary contacts connected to said current lead plugs respectively, said switch comprising a pair of stationary contacts in circuit with the higher current lead plug for "starting", a second pair of stationary contacts in circuit with the lower current lead plug for normal welding, a slidable rod carrying a switch cross bar, means for connecting said rod to the plunger of said solenoid, spring means for normally holding said movable bar in contact with the lower current stationary contacts, a push button-operated direct current circuit to energize said solenoid and cause said plunger to move said bar into engagement with the higher current contacts of said switch, and means responsive to said spring for causing said switch bar to automatically return from said higher current contacts to said lower current contacts rapidly when said push button is released, whereby the welding may be started with a relatively high amperage until the work has been warmed up sufficiently, and may be continued at the normal current of lower amperage for the remainder of said welding operation.

4. In an electrical arc welding apparatus, a resistance control box having a plurality of sockets representing different welding current values, a source of current connected to the input terminals of said box, means for connecting one output terminal of said box to the article being welded, the other output terminal of said box comprising a plurality of lead-out sockets representing different welding current values, a pair of current lead plugs to be selectively inserted into any two of said sockets, a solenoid-operated switch having a pair of stationary contacts connected to said current lead plugs respectively, said switch comprising a pair of stationary contacts in circuit with the higher current lead plug for "starting," a second pair of stationary contacts in circuit with the lower current lead plug for normal welding, a slidable rod carrying a switch cross bar, means for connecting said rod to the plunger of said solenoid, spring means for normally holding said movable bar in contact with the lower current stationary contacts, and a push button-operated direct current circuit to energize said solenoid and cause said plunger to move said bar into engagement with the higher current contacts of said switch, whereby the welding may be started with a relatively high amperage until the work has been warmed up sufficiently, and may be continued at the normal current of lower amperage for the remainder of said welding operation.

RUSSELL E. SMITH.